May 24, 1949. W. E. HANSON 2,470,849
RECOVERY OF BY-PRODUCT ACIDS
Filed Dec. 19, 1946
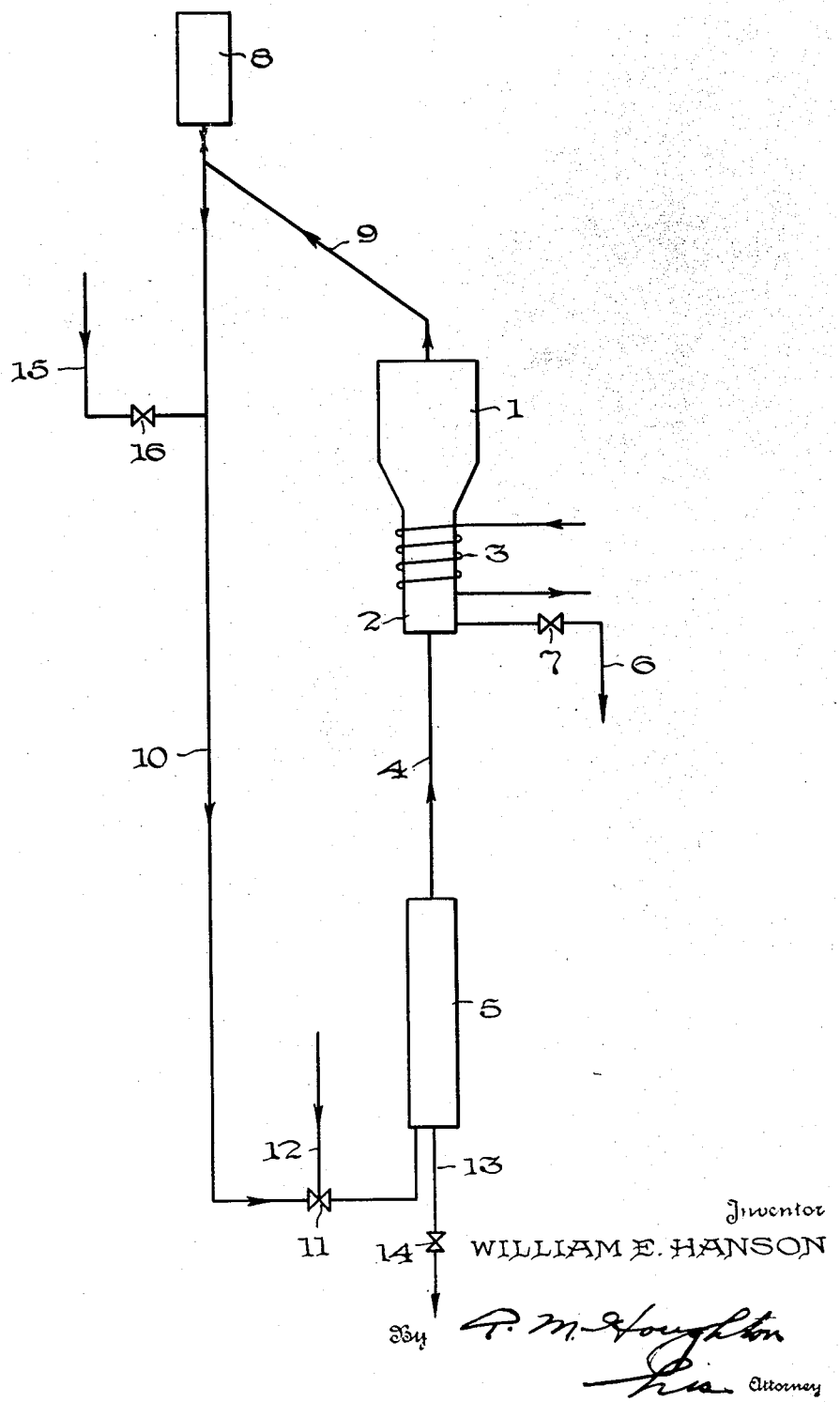
Inventor
WILLIAM E. HANSON
By P. M. Houghton
his Attorney Patented May 24, 1949

2,470,849

UNITED STATES PATENT OFFICE 2,470,849

RECOVERY OF BY-PRODUCT ACIDS

William E. Hanson, Gibsonia, Pa., assignor to Gulf Research & Development Company, Pittsburgh, Pa., a corporation of Delaware Application December 19, 1946, Serial No. 717,243

10 Claims. (Cl. 260—537)

This invention relates to the recovery of useful products from certain acidic by-product materials, and in particular concerns a process for obtaining light-colored useful products from the waste products obtained in the manufacture of sebacic acid from castor oil or from esters or salts of ricinoleic acid in general. It also concerns the useful products obtained by such process.

At the present time, sebacic acid is produced commercially by treating castor oil with caustic alkali at elevated temperatures. The initial reaction product consists primarily of capryl alcohol and the sodium salt of sebacic acid, together with smaller quantities of methyl hexyl ketone, the sodium salts of various acids formed by side reactions, and other by-products. The crude product is usually distilled to remove the capryl alcohol, methyl hexyl ketone and other volatile components, after which the still residue is dissolved in water and acidified with a mineral acid to a pH of about 6. Stratification of the mixture occurs, and the lower aqueous layer, which contains the mono-sodium salt of sebacic acid, is separated and is further acidified to precipitate free sebacic acid. The upper oily layer, which contains the acids formed by side reactions, is then acidified, washed and dried, and distilled under vacuum at a temperature of about 270° C. under 4–10 mm. pressure to remove fatty acids of the nature of stearic and oleic acids. The still residue, which is herein referred to as the "non-volatile by-product acid mixture," is a dark-colored highly viscous liquid comprising a mixture of long-chain polycarboxylic acids. It is characterized by an acid number of about 140–165 and an iodine number of about 45–60, and is substantially non-volatile, being capable of only partial distillation even when molecular distillation procedures are employed.

While the above-described non-volatile by-product acid mixture is inherently useful for the manufacture of polybasic acid-polyhydric alcohol type of resinous condensation products, such use has been greatly limited since the resinous products obtained retain the very dark color of the non-volatile by-product acid mixture. Heretofore, all attempts to remove the dark-colored components from the non-volatile by-product acid mixture, either by chemical or physical treatment, have either failed entirely or have secured only indifferent results by commercially impractical procedures.

It is accordingly an object of the present invention to provide a commercial method for obtaining light-colored useful products from the hereinbefore described non-volatile by-product acid mixture obtained in the manufacture of sebacic acid from castor oil and other esters or salts of ricinoleic acid.

A further object is to provide new chemical products useful in the manufacture of synthetic resins, plasticizing agents, and other products made from relatively high molecular weight polycarboxylic acids.

Other objects will be apparent from the following detailed description of the invention, and various advantages not specifically referred to herein will be apparent to those skilled in the art upon employment of the invention in practice.

I have now found that the above objects and attendant advantages may be attained through a process comprising a controlled combination of chemical and physical treatments of the non-volatile by-product acid mixture, whereby such mixture may be separated into one or more light-colored fractions totalling as much as 90 per cent by weight of the original mixture, and as little as 10 per cent by weight of a very dark brownish-black residue containing practically all of the color bodies present in the original mixture. This process is based on the discovery that by treating the non-volatile by-product acid mixture with water in the presence of a mutual solvent for the water and the by-product acid mixture, certain chemical modifications take place giving rise to new light-colored products which, however, have the desirable properties and inherent chemical nature of the original acid mixture. The nature of such chemical modification is not known with certainty, but since the total number of moles of products obtained from the process is greater than the number of moles of by-product acid mixture subjected to the process, it is believed that hydration takes place, effecting hydrolysis of polycarboxylic anhydride compounds to the corresponding polycarboxylic acid compounds. The anhydride compounds that are considered to undergo hydration or hydrolysis are anhydrides of two or more moles of carboxylic acid compounds so that the hydration or hydrolysis results in products containing an increased number of moles. Furthermore, while the total carboxyl content of the products corresponds closely to the total carboxyl content of the by-product acid mixture, the free carboxyl content of the products is appreciably less than the free carboxyl content of the by-product acid mixture, thus indicating that free carboxyl groups of polycarboxylic acid bodies present in the by-product acid mixture are changed to a latent form, possibly to lactone groups.

The process is further based on the discovery that the light-colored products formed by the aforesaid chemical modification may be recovered from the reaction mixture by selective solvent extraction, and that certain organic solvents may be employed both as the mutual solvent in the chemical modification treatment and as the extractant in isolating the products formed by such treatment. Hence, by careful selection of the organic solvent and the concentration thereof with respect to the water present, the chemical modification and solvent extraction steps may be effected concurrently, thus permitting the desired production of valuable products from the original by-product acid mixture to be effected by a simple, economical, one-step process which, as is hereinafter more fully explained, may be carried out batch-wise or continuously.

The process of the invention accordingly consists essentially in the extraction of the non-volatile by-product acid mixture obtained in the manufacture of sebacic acid from castor oil or equivalent ricinoleic acid esters or salts with an aqueous organic solvent mixture, the nature and concentration of which is so chosen and controlled that there is obtained (1) one or more extracted fractions having colors substantially lighter than the original by-product acid mixture, and (2) a relatively small residue containing the preponderance of the color bodies present in the original by-product mixture.

As stated above, the process may be carried out in such manner that there is obtained a single extracted fraction of improved color and a residue containing most of the color bodies. The color of such single extracted fraction, however, is a function of the proportion which it represents of the original by-product acid mixture, which proportion is in turn proportional to the concentration of organic solvent in the aqueous organic solvent mixture. Thus, for example, the by-product acid mixture may be extracted with an aqueous organic solvent mixture of relatively high concentration, e. g., one containing 90 per cent by weight of the organic solvent, to obtain a single extracted fraction comprising a relatively large proportion, e. g., 75 per cent or more, of the by-product acid mixture subjected to the extraction. The color of such single fraction, however, while being substantially lighter than that of the original mixture, will be substantially darker than that of a smaller single fraction obtained by extracting the mixture with a more dilute aqueous organic solvent mixture, e. g., one containing 80 per cent by weight of the organic solvent.

Accordingly, an important and advantageous feature of the present process resides in its being readily controlled to recover from the by-product acid mixture products of varying color, all of which, however, are substantially lighter-colored than the original mixture. A preferred mode of carrying out the extraction process consists in continuously or semi-continuously increasing the concentration of organic solvent in the aqueous organic solvent mixture employed as the extractant so as to obtain a plurality of extracted fractions of gradually increasing depth of color. By operating in such manner, there is effected a color fractionation whereby a large proportion of the by-product acid mixture is recovered in the form of a series of fractions, the number of which may be varied entirely at will. In this way the more valuable lighter-colored products may be isolated and made available for uses where light color is essential, and the somewhat darker-colored products are available for less critical uses.

In the accompanying drawing, the single figure is a schematic representation of an extraction apparatus in which the process of the invention has been carried out. In said figure, 1 represents a solvent boiler having a narrow elongated bottom portion 2 which is heated by means of a steam coil 3. Positioned below the boiler 1 and connected therewith by means of a conduit 4 is a reservoir 5. Boiler discharge conduit 6 is connected to the bottom of boiler 1 through valve 7. Boiler 1 is connected to a condenser 8 by means of vapor conduit 9 which is so positioned that liquid condensate from condenser 8 does not enter vapor conduit 9, but passes to the bottom of reservoir 5 through conduit 10. Valve 11 interposed in conduit 10 is a three-way valve permitting reservoir 5 to be connected either to conduit 10 or to a charging conduit 12. Reservoir discharge conduit 13 is connected to reservoir 5 through valve 14. Inlet conduit 15 is connected to conduit 10 through valve 16. The operation of this apparatus is as follows:

The material to be extracted is charged into reservoir 5 through conduit 12 and valve 11, valves 7 and 14 being closed. Valve 11 is then positioned so as to connect conduit 10 with reservoir 5, and valve 16 is opened. The apparatus is then filled with the desired aqueous organic solvent mixture through conduit 15 until the liquid level stands about half-way up in boiler 1. Valve 16 is then closed and steam is admitted to the steam coil 3 to heat the aqueous solvent mixture to boiling. As the aqueous solvent boils, a vapor mixture of water and solvent leaves boiler 1 through conduit 9 and passes into condenser 8 where it is condensed. The liquid condensate passes down through conduit 10, up through the material being extracted in reservoir 5 and back into the boiler 1 through conduit 4, thus establishing a continuous circulation of aqueous solvent mixture. As the circulating stream of aqueous solvent passes up through the material being extracted in reservoir 5, the soluble components are dissolved and carried up into the boiler 1. As the extraction continues, however, more and more of the soluble components accumulate in the lower part of the boiler 1 until the time is reached when the aqueous solvent mixture becomes saturated. At this point the soluble components begin to precipitate out of the aqueous solvent mixure and pass down through conduit 4 and back into reservoir 5 in the form of very fine droplets. In their downward passage through conduit 4, however, these droplets pass countercurrent to the rising stream of aqueous solvent mixture and are thus subjected to a very efficient extraction. After equilibrium conditions have been attained, i. e., when the quantity of material dissolved in the reservoir is equal to that which precipitates out in the lower part of boiler 1, valve 7 is opened so that the saturated extract phase in boiler 1 may be withdrawn through conduit 6 and passed to a suitable apparatus for removing the aqueous solvent mixture and recovering the extracted fraction. The residue remaining in reservoir 5 may be drawn off through valve 14 and conduit 13.

The above-described apparatus and method of operation may be applied to the practice of the present invention employing as the extractant a suitable aqueous organic solvent mixture, the concentration of which is so selected that the single extract fraction obtained is of the desired color grade. As previously stated, the depth of color of the extract is proportional to the concentration of organic solvent in the aqueous solvent mixture, so that if it is desired to recover a relatively small fraction of very light color the concentration of the organic solvent in the aqueous solvent mixture should be relatively low, e. g., 75 to 85 per cent by weight. If, on the other hand, a larger fraction of deeper color is desired, the aqueous solvent mixture will be of higher concentration, i. e., it will contain 90–95 per cent by weight of the organic solvent.

The above-described apparatus may likewise be employed in recovering a series of extract fractions of different color grades as hereinbefore described. When operating according to such preferred mode of operation, the apparatus is initially filled with an aqueous organic solvent mixture of such nature and concentration that the initial extract fraction obtained is of the lightest color desired. The extraction is carried out as previously described, and after equilibrium conditions have been attained in boiler 1, the extract phase therein is withdrawn through valve 7 and conduit 6, and is replaced with an equal amount of aqueous solvent mixture of higher organic solvent concentration. The extraction is again carried out as before, the extract phase being withdrawn when equilibrium is attained and replaced with aqueous solvent mixture of still higher organic solvent concentration. This operation may be carried out any desired number of times to obtain an equivalent number of extract fractions which are subsequently treated to remove the aqueous solvent mixture and recover a series of products of gradually increasing depth of color. The number of such fractions depends on the difference in concentration of the successive portions of added aqueous solvent mixture.

The following example illustrates one way in which the principle of the invention has been applied, but is not to be construed as limiting the same.

EXAMPLE

Approximately 820 parts by weight of the nonvolatile by-product acid mixture obtained in the manufacture of sebacic acid from castor oil was placed in the reservoir of an extraction apparatus constructed substantially as shown in Figure 1. The by-product acid mixture employed was deep brownish-black viscous liquid having a neutralization number of about 153, a saponification number of about 185, a Hanus iodine number of about 40, and a density of about 0.950 at 25° C. Aqueous methyl alcohol of approximately 85 per cent by weight concentration was then added to the apparatus until the boiler was about half filled with solvent, approximately 4000 parts by weight of the aqueous solvent being required for this purpose. Heat was applied at the bottom of the boiler, whereby aqueous methyl alcohol was distilled from the boiler, condensed, and returned the reservoir as previously explained. Since the boiling point of methyl alcohol is below that of water, the vaporized material leaving the boiler was predominantly methyl alcohol while the solvent mixture remaining in the boiler had an increased water content. When the aqueous solvent in the boiler had assumed a pale yellow color, approximately 145 parts by weight of an initial extract phase fraction were withdrawn from the boiler. Since it appeared that a second fraction could be obtained by another extraction with solvent of the same concentration, the quantity of liquid withdrawn from the boiler was replaced with an equal quantity of 85 per cent aqueous methyl alcohol, and the extraction was continued as before. After equilibrium conditions had been attained, a second extract phase fraction of about 145 parts by weight was withdrawn from the boiler, and was replaced with an equal quantity of 87 per cent aqueous methyl alcohol. This procedure was repeated, employing gradually increasing concentrations of aqueous methyl alcohol, until a total of nine extract phase fractions were withdrawn from the boiler. These fractions were identified as follows:

| Extract Phase Fraction No. | Concentration o Aqueous Methy Alcohol Employed in Obtaining the Fraction |
|---|---|
| | Percent by weight |
| 1 | 85 |
| 2 | 85 |
| 3 | 87 |
| 4 | 89 |
| 5 | 90 |
| 6 | 92 |
| 7 | 94 |
| 8 | 96 |
| 9 | 98 |

A tenth extract phase fraction was obtained by a final extraction with 98 per cent aqueous methyl alcohol to which had been added about 5 per cent by weight of acetone. The residue which remained in the reservoir was withdrawn and was identified as fraction 11. The aqueous solvent was removed from each of fractions 1 to 11, inclusive, by counter-current gas-stripping, and the solvent-free fractions were weighed and examined as to their color. These data are tabulated as follows:

| Solvent-Free Fraction No. | Weight Parts | Color |
|---|---|---|
| 1 | 114.7 | Pale yellow. |
| 2 | 110.4 | Do. |
| 3 | 85.1 | Pale amber. |
| 4 | 106.6 | Do. |
| 5 | 30.9 | Amber. |
| 6 | 46.3 | Light orange. |
| 7 | 54.2 | Deep orange. |
| 8 | 49.8 | Clear red. |
| 9 | 52.7 | Do. |
| 10 | 90.3 | Clear reddish-brown. |
| 11 | 102.6 | Deep reddish-brown. |

Total weight fractions 1–10, inclusive=726.0.

It will be seen from the above data that of the 820 parts by weight of the by-product acid mixture subjected to the aqueous solvent extraction, approximately 726 parts, or 88.5 per cent, as represented by solvent-free fractions 1 to 10, inclusive, were obtained in the form of clear liquid products. Also of the 820 parts of by-product acid mixture, approximately 638 parts, or 77.5 per cent, as represented by solvent-free fractions 1 to 9, inclusive, were of a light color satisfactory for most uses.

The following table presents analytical data indicative of the chemical modification which took place during the above-described extraction process:

Table

| Solvent-free Fraction No. | Molecular Weight | Moles | Total COOH per Mole [1] | Free COOH per Mole [2] | Latent COOH per Mole [3] | Total Moles COOH |
|---|---|---|---|---|---|---|
| Non-Volatile By-Product Acid Mixture | 1,140 | 7.2 | 3.76 | 3.11 | 0.65 | 27.1 |
| 1 | 700 | 1.64 | 2.54 | 1.56 | 0.98 | 4.17 |
| 2 | 360 | 3.07 | 1.30 | 0.64 | 0.66 | 4.00 |
| 3 | 570 | 1.49 | 2.08 | 0.82 | 1.26 | 3.09 |
| 4 | 540 | 1.86 | 1.87 | 0.58 | 1.29 | 3.48 |
| 5 | 600 | 0.51 | 2.24 | 0.59 | 1.65 | 1.14 |
| 6 | 675 | 0.68 | 2.11 | 0.45 | 1.66 | 1.43 |
| 7 | 700 | 0.77 | 2.31 | 0.42 | 1.89 | 1.78 |
| 8 | 735 | 0.55 | 2.16 | 0.38 | 1.78 | 1.19 |
| 9 | 815 | 0.63 | 2.44 | 0.38 | 2.06 | 1.54 |
| 10 | 1005 | 0.89 | 3.04 | 0.37 | 2.67 | 1.36 |
| 11 | 1305 | 0.78 | 3.87 | 0.26 | 3.61 | 3.02 |
| Total, 1-11 inclusive | | 12.87 | | | | 27.56 |

[1] Calculated from saponification number.
[2] Calculated from neutralization number.
[3] Latent COOH/mole = (total COOH/mole) − (free COOH/mole).

It will be noted from these data that a total of 12.87 moles of products were recovered, although the number of moles taken was only 7.2, thus indicating that during the extraction process some of the high molecular weight compounds in the by-product acid mixture are broken down to form compounds of lower molecular weight. It has previously been stated that it is believed that the process involves hydration or hydrolysis of the acid mixture, such action being the only reasonable explanation for the increase in the number of moles in the product over those in the acid mixture subjected to extraction. It will be noted that during the extraction, the extracted portion of the acid mixture is maintained in the solvent boiler in solution in an aqueous mixture at the boiling point of the mixture. Thus the extracted portion is maintained in solution under conditions adapted to cause hydrolysis. Such reaction is not accompanied by decarboxylation, however, as indicated by the fact that the total carboxyl content of the extracted fractions is approximately equal to the carboxyl content of the original by-product acid mixture. The nature of the carboxyl groups, on the other hand, is changed as indicated by the fact that as the extraction proceeds the free carboxyl content of the extract fractions decreases with a corresponding increase in the latent carboxyl content.

While the preceding detailed description discloses a preferred manner of carrying out the process of the invention, it will be realized that such mode of operation is merely illustrative and that the principle of the invention is not limited thereby. Thus, any suitable form of extraction apparatus may be employed and the process may be carried out batch-wise, semi-continuously, or continuously. Similarly, instead of methyl alcohol, other water-soluble lower aliphatic alcohols, i. e., ethyl and propyl alcohols; water-soluble lower aliphatic ketones, i. e., acetone and methyl ethyl ketone; and water-soluble cyclic ethers, such as dioxane, may be employed as the organic solvent. The concentration in which the organic solvent is employed in the aqueous solvent mixture depends upon the nature of the organic solvent itself as well as upon the degree of coloration desired in the extracted product as hereinbefore explained, but will usually be at least about 75 per cent by weight, preferably between about 80 and about 98 per cent by weight.

It will be apparent from the foregoing that the chemical and physical properties of the products obtained by the process of the invention depend to a considerable extent upon various factors in the process itself, i. e., the particular solvent employed, the concentration of the aqueous solvent mixture, etc., and that certain of these factors may be readily controlled to obtain products of specific characteristics. In general, however, these products range in physical form from clear pale liquids of medium viscosity to deep amber liquids of high viscosity. They are soluble to varying degrees in a wide variety of organic solvents, including alcohols, ketones, ethers, and naphthenic and aromatic hydrocarbons. They range in molecular weight from about 300 to about 1300, and have saponification numbers between about 150 and about 225. Their neutralization numbers are lower than the saponification numbers, ranging from about 10 to about 140, thus indicating that at least part of the carboxyl groups are in latent form. Despite the fact that these products are derived by a chemical modification of at least some of the components of the by-product acid mixture from which they are obtained, they retain the polycarboxylic nature of such mixture, and in general are useful for the same purposes.

Other modes of applying the principle of my invention may be employed instead of those explained, change being made as regards the procedure or ingredients employed provided the step or steps set forth in any of the following claims be employed or the compositions defined by any of such claims be obtained.

I claim as my invention:

1. The process of obtaining useful products from the non-volatile by-product acid mixture obtained in the manufacture of sabacic acid by treatment of a member of the group consisting of castor oil and esters and salts of ricinoleic acid with an alkali, said process comprising contacting said acid mixture under extraction and hydrolyzing conditions with an aqueous mixture of a water-soluble lower aliphatic alcohol, separating an extract phase containing chemically modified components of said acid mixture and having substantially lighter color than said acid mixture, and thereafter removing the aqueous alcohol mixture from said extract phase to recover said lighter-colored chemically modified components.

2. The process of obtaining useful products from the non-volatile by-product acid mixture obtained in the manufacture of sebacic acid by treatment of castor oil with an alkali, said process comprising contacting said acid mixture under extraction and hydrolyzing conditions with an aqueous water-soluble lower aliphatic alcohol mixture of at least about 75 per cent alcohol concentration, separating an extract phase containing chemically modified components of said acid mixture and having substantially lighter color than said acid mixture, and thereafter removing the aqueous alcohol mixture from said extract phase to recover said lighter-colored chemically modified components.

3. The process of obtaining useful products from the non-volatile by-product acid mixture obtained in the manufacture of sebacic acid by treatment of castor oil acid with an alkali, said process comprising contacting said acid mixture under extraction and hydrolyzing conditions with an aqueous water-soluble lower aliphatic alcohol mixture of at least about 75 per cent alcohol concentration, separating an extract phase containing chemically modified components of said acid mixture and having substantially lighter color than said acid mixture, contacting the residue under extraction and hydrolyzing conditions with a second portion of aqueous water-soluble lower aliphatic alcohol mixture, said second portion being of higher alcohol concentration than the preceding portion, separating a second extract phase containing chemically modified components of said acid mixture and having substantially lighter color than said acid mixture, repeating said contacting of the residue and separating operations a plurality of times to obtain a plurality of extract phase portions, and removing the aqueous water-soluble lower aliphatic alcohol mixture from said extract phase portions to recover a plurality of extracted fractions comprising chemically modified components of said acid mixture and having substantially lighter color than said acid mixture.

4. The process of obtaining useful products from the non-volatile by-product acid mixture obtained in the manufacture of sebacic acid by treatment of castor oil with an alkali, said process comprising contacting said acid mixture under extraction and hydrolyzing conditions with aqueous methyl alcohol of at least about 75 per cent methyl alcohol concentration, separating an extract phase containing chemically modified components of said acid mixture and having substantially lighter color than said acid mixture, and thereafter removing the aqueous methyl alcohol from said extract phase to recover said lighter-colored chemically modified components.

5. The process of obtaining useful products from the non-volatile by-product acid mixture obtained in the manufacture of sebacic acid by treatment of castor oil with an alkali, said process comprising contacting said acid mixture under extraction and hydrolyzing conditions with aqueous methyl alcohol of between about 80 and about 98 per cent methyl alcohol concentration, separating an extract phase containing chemically modified components of said acid mixture and having substantially lighter color than said acid mixture, and thereafter removing the aqueous methyl alcohol from said extracted phase to recover said lighter-colored chemically modified components.

6. The process of obtaining useful products from the non-volatile by-product acid mixture obtained in the manufacture of sebacic acid by treatment of castor oil with an alkali, said process comprising contacting said acid mixture under extraction and hydrolyzing conditions with aqueous methyl alcohol of at least about 75 per cent methyl alcohol concentration, separating an extract phase containing chemically modified components of said acid mixture and having substantially lighter color than said acid mixture, contacting the residue under extraction and hydrolyzing conditions with a second portion of aqueous methyl alcohol of higher methyl alcohol concentration than the preceding portion, separating a second extract phase containing chemically modified components of said acid mixture and having substantially lighter color than said acid mixture, repeating said contacting and separating operations a plurality of times to obtain a plurality of extract phase portions, and removing the aqueous methyl alcohol from said extract phase portions to recover a plurality of extracted fractions comprising chemically modified components of said acid mixture and having substantially lighter color than said acid mixture.

7. The process of obtaining useful products from the non-volatile by-product acid mixture obtained in the manufacture of sebacic acid by treatment of a member of the group consisting of castor oil and esters and salts of ricinoleic acid with an alkali, which comprises circulating an aqueous methyl alcohol mixture in contact with a body of said acid mixture to extract components therefrom, passing the methyl alcohol mixture containing extracted components upwardly to a vaporizing zone, maintaining the temperature of said vaporizing zone at the boiling point of the mixture contained therein to continuously evolve vapors, condensing the vapors formed in said vaporizing zone and recirculating the condensed vapors into contact with a non-volatile by-product acid mixture as above described, removing methyl alcohol mixture containing extracted components, and recovering the extracted components.

8. The process of obtaining useful products from the non-volatile by-product acid mixture obtained in the manufacture of sebacic acid by treatment of a member of the group consisting of castor oil and esters and salts of ricinoleic acid with an alkali, which comprises circulating a solvent mixture containing water and methyl alcohol in contact with a body of said acid mixture to extract components therefrom, passing said solvent mixture containing extracted components upwardly to a vaporizing zone, maintaining the temperature of said vaporizing zone at the boiling point of the mixture contained therein to produce vapors predominantly composed of vapors of methyl alcohol and to retain in said vaporizing zone a mixture in liquid phase comprising water, methyl alcohol and extracted components, said mixture in liquid phase containing a greater amount of water relative to the amount of methyl alcohol than the relative amount of water in the solvent mixture circulated into contact with said acid mixture, condensing the vapors formed in said vaporizing zone and recirculating the condensed vapors into contact with a non-volatile by-product acid mixture as above described, removing solvent mixture containing extracted components, and recovering the extracted components.

9. A process in accordance with claim 8 in which the solvent mixture employed is of at least 75 per cent methyl alcohol concentration.

10. The process of obtaining useful products from the non-volatile by-product acid mixture obtained in the manufacture of sebacic acid by treatment of a member of the group consisting of castor oil and esters and salts of ricinoleic acid with an alkali, which comprises circulating a solvent mixture containing water and methyl alcohol in contact with a body of said acid mixture to extract components therefrom, passing said solvent mixture containing extracted components upwardly to a vaporizing zone, maintaining the temperature of said vaporizing zone at the boiling point of the mixture contained therein to produce vapors predominantly composed of vapors of methyl alcohol and to retain in said vaporizing zone, a mixture in liquid phase comprising water, methyl alcohol and extracted components, said mixture in liquid phase containing a greater amount of water relative to the amount of methyl alcohol than the relative amount of water in the solvent mixture circulated into contact with said acid mixture, condensing the vapors formed in said vaporizing zone and recirculating the condensed vapors in contact with the acid mixture, continuing circulation of said solvent mixture until equilibrium conditions have been attained, removing solvent mixture containing extracted components, and recovering the extracted components comprising chemically modified components of said acid mixture.

WILLIAM E. HANSON.

REFERENCES CITED

The following references are of record in the file of this patent:

UNITED STATES PATENTS

| Number | Name | Date |
|---|---|---|
| 2,054,979 | Jahrstorfer et al. | Sept. 22, 1936 |
| 2,153,302 | Ewing | Apr. 4, 1939 |
| 2,163,268 | Carothers et al. | June 20, 1939 |
| 2,182,056 | Bruson et al. | Dec. 5, 1939 |
| 2,193,321 | Leithe | Mar. 12, 1940 |
| 2,217,515 | Houpt | Oct. 8, 1940 |
| 2,217,516 | Houpt | Oct. 8, 1940 |
| 2,316,099 | Myers | Apr. 6, 1943 |
| 2,318,762 | Davis et al. | May 11, 1943 |

OTHER REFERENCES

Gatterman, "Organic Chem." (Macmillan, 1896), pages 39–42.

Gatterman, "Practical Methods of Org. Chem." (Macmillan, 1923), pages 43–50.